ADOLPH MILLOCHAU, OF NEW YORK, N. Y.

Letters Patent No. 88,658, dated April 6, 1869.

IMPROVED MODE OF DEODORIZING THE SPENT LIME OF GAS-WORKS.

The Schedule referred to in these Letters Patent and making part of the same.

*To all whom it may concern:*

Be it known that I, ADOLPH MILLOCHAU, of the city and State of New York, have invented and made a new and useful Improvement in Deodorizing Spent Lime in Gas-Works; and I do hereby declare the following to be a full, clear, and exact description of the said invention, and of the object to be accomplished thereby.

In the purification of gas, lime is generally employed, supported in layers on a series of perforated floors. This has to be replaced when spent, and after the spent lime is removed, a chemical reaction takes place in the presence of the atmosphere, evolving very offensive and noxious gases and odors, in the form of hydrosulphurous gas and sulphite of ammonia.

The object of my invention is to prevent the chemical reaction that produces these gases; and My said invention consists in the use of soapy, or oily material, mixed with said spent lime, when removed from the purifier.

I find that soap made from petroleum answers well, but other characters of soap, or oily material, may be employed.

The said soap, or oily material, is to be mixed with water, and a box or vat provided, into which the spent lime is shovelled from the purifier, and in which is said soapy water, or the said soapy water may be sprinkled upon the lime as it is drawn out, and the two are mixed together.

The water dissolves some of the ammoniacal substances, the alkaline portion of the liquid reacts, to prevent atmospheric action, and the sulphur is partially liberated, or acts to form sulphite of lime, and the greasy portions of the soapy or oily mixture, aid in excluding the atmosphere, and preventing the reaction heretofore taking place.

This mode of protecting the spent lime from chemical reaction and decomposition under atmospheric influences, is of great importance, as the health of the neighborhood is frequently impaired, especially in warm weather, by the spent lime while awaiting removal from the yard of the gas-works.

What I claim, and desire to secure by Letters Patent, is—

The method, herein specified, of preventing chemical reaction and decomposition in the spent lime of gas-works, as specified.

In witness whereof, I have hereunto set my signature, this 5th day of March, 1869.

AD. MILLOCHAU.

Witnesses:
CHAS. H. SMITH,
GEO. T. PINCKNEY.